(Model.)
2 Sheets—Sheet 1.
C. SCHOLZ.
HORSE HAY RAKE.
No. 255,681. Patented Mar. 28, 1882.
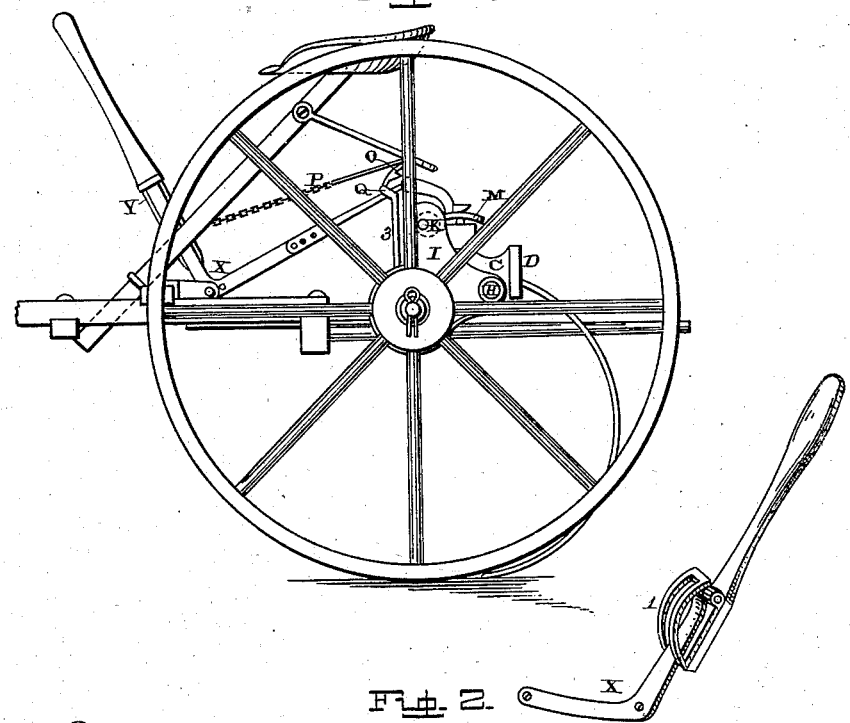
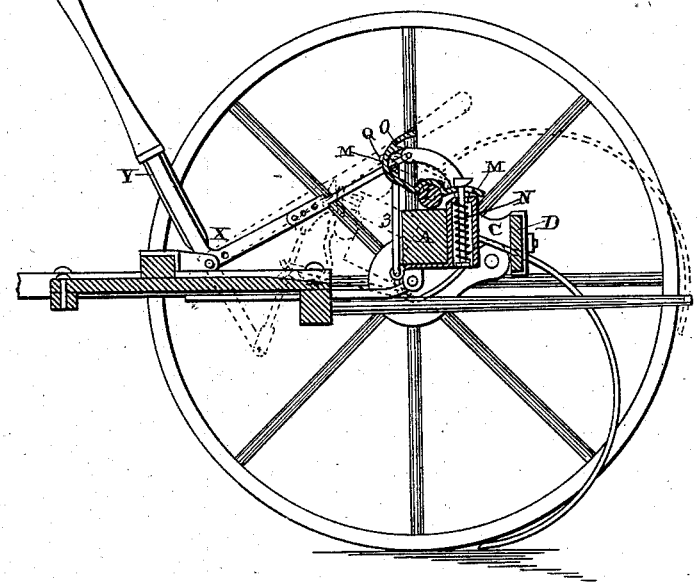
Witnesses:
J. W. Garner
W. S. D. Haines
Inventor:
Chas. Scholz,
per
F. A. Lehmann,
Atty.

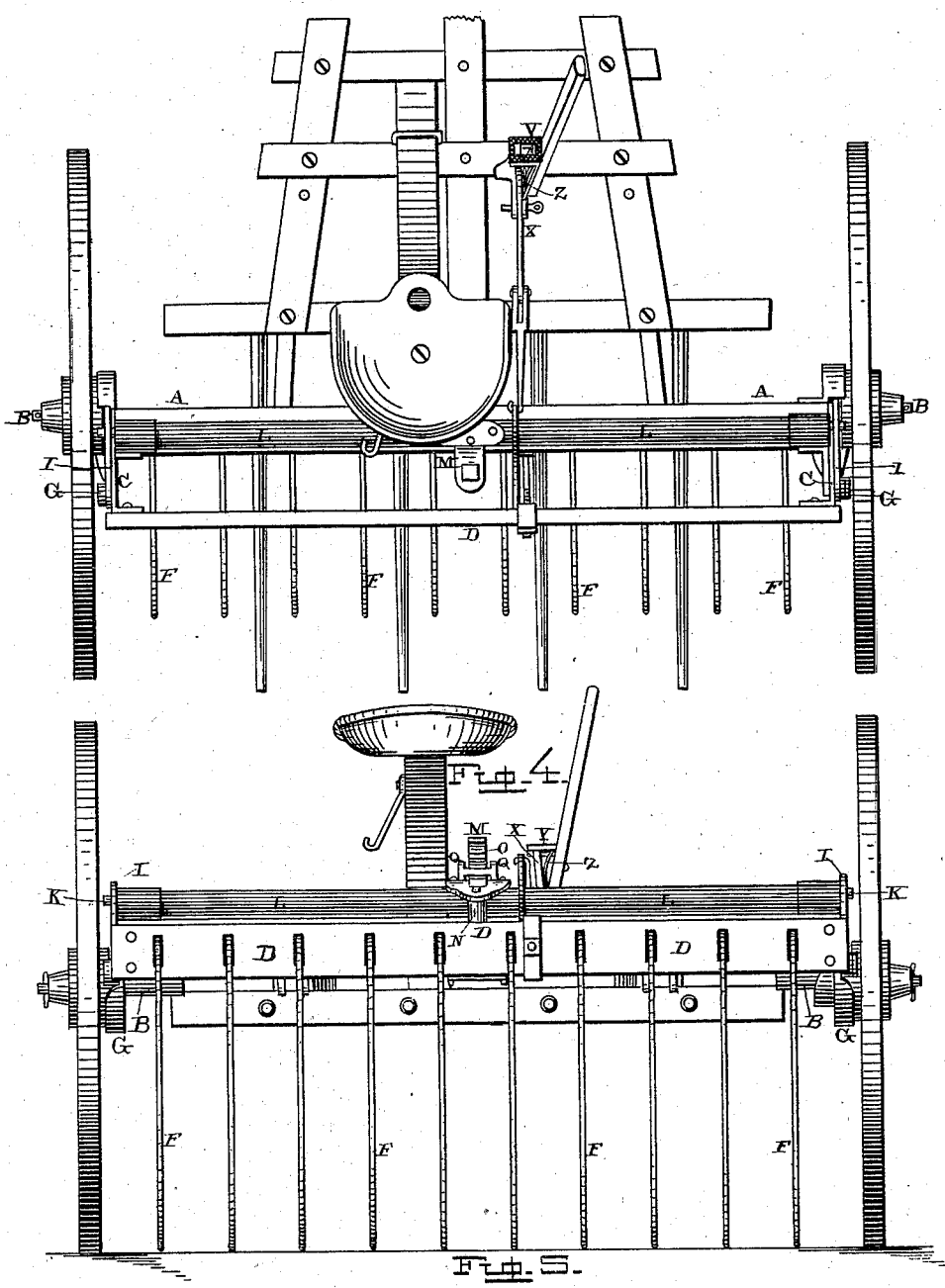

UNITED STATES PATENT OFFICE.

CHARLES SCHOLZ, OF DAYTON, OHIO.

HORSE HAY-RAKE.

SPECIFICATION forming part of Letters Patent No. 255,681, dated March 28, 1882.

Application filed September 19, 1881. (Model.)

*To all whom it may concern:*

Be it known that I, CHARLES SCHOLZ, of Dayton, in the county of Montgomery and State of Ohio, have invented certain new and useful Improvements in Horse Hay-Rakes; and I do hereby declare the following to be a full, clear, and exact description of the invention, such as will enable others skilled in the art to which it pertains to make and use it, reference being had to the accompanying drawings, which form part of this specification.

My invention relates to an improvement in horse hay-rakes; and it consists in the combination of a rake-head having secured to each of its ends a suitable casting; locking-plates which are pivoted upon the castings, and which engage with teeth made inside of the hubs of the wheels; an oscillating rod or bar having pins or projections secured eccentrically to its ends, and which operate the locking-plates when the rod or bar is turned, whereby the forward motion of the machine is made to dump the load.

It further consists in the combination of a notched arm which projects forward from the oscillating rod or bar, provided with the eccentric points, and a pivoted loop having projections upon its upper end, so that after the loop has caught in the notch of the arm, locking the rod or bar forward and causing the locking-plates to lock the wheel, the loop continues in the notch on the arm until the rake-head is turned sufficiently far for the projections on the loop to strike against the front part of the frame, when the loop is disengaged from the arm and the rake-head returns to position of its own weight.

It further consists in the oscillating rod or bar provided with the eccentric points upon its ends and suitable pivoted locking-plates which engage with the cogs formed in the hubs of the wheels, a spring for returning the rod or bar to position after it has been moved, and a locking-loop which is operated by the tilting movement of the rake-head, so as to release the wheels as soon as the load is dumped.

It still further consists in a hand-lever having both a pivoted movement, so that it can be moved back and forth, and a sidewise movement, so that it will move sidewise out of the way of the operator.

The object of my invention is to produce a horse hay-rake of that class in which the load is dumped by the forward movement of the machine, and which requires nothing more on the part of the operator than a slight movement of one of his feet whenever he desires to free the teeth from the load which has been gathered.

Figure 1 is a side elevation of my invention, with one of the wheels removed. Fig. 2 is a vertical section taken through the spring. Fig. 3 is a plan view. Fig. 4 is a rear view. Fig. 5 is a detached view of the locking-plate and hub.

A represents the rake-head, which may be of any construction preferred, and which has secured to the under side of each one of its ends a short axle, B. Instead of the short axles, as here shown, the axle may be made in a single piece and extend entirely through from side to side. Secured to each end of the rake-head is a flat casting, C, which extends rearwardly and has its rear end fastened to the board D, which is provided with a series of slots for the teeth F to pass through. These castings may either be provided with the curved horizontal flanges G, for extending around the lower portion of the hubs of the driving-wheels, or the flanges may be formed independently of the castings, as may be preferred. The castings have holes made through those portions which extend down below the rake-head for the axle to pass through. Formed upon the outer sides of these castings, near their rear ends, are the pivots H, upon which the locking-plates I are placed. These locking-plates extend forward and upward above the top of the rake-head, and have holes made through them for the axles to pass through. Formed upon each one of these plates, on the outer side, is the locking-flange I', which engages with the cogs J, which are formed in the inner peripheries of the inner ends of the hubs, for the purpose of locking the wheels when it is desired that the forward movement of the machine shall dump the load. Through the upper ends of these locking-plates are formed holes, through which pass the eccentric points or projections K, which extend outward from the ends of the oscillating rod or bar L. This bar L, having an oscillating movement, is here shown as being placed upon the top of the rake-head and extending from one end to the other; but this position upon the rake-head is not necessary, for it may be placed in other positions and act equally as well.

The great object gained by having the casting C secured to the ends of the rake-head and having the locking-plates I pivoted to these castings some distance in the rear of the axle consists in dispensing with the spring-dogs which have heretofore been used and causing the plates to do the locking without the help of any intermediate device.

Secured to the oscillating rod or bar L is an arm, M, which extends backward and has a spring, N, connected to it for the purpose of drawing the bar back into position after it has been moved. The front end of this arm or lever M extends a suitable distance forward, is curved upward, as shown, and has the notch O formed on its rear side. The upper end of this front end of the arm or lever is connected to a continuous chain or the rod and chain P, upon which the driver places his foot when he desires to dump the load. In pressing downward upon this chain P the oscillating rod or arm is turned forward in the two bearings which are formed by the eccentric points in the locking-plates, and the locking-plates are thereby turned upon the pivots H, so that the locking-flanges I' are forced into the cogs that are formed in the inner end of each one of the hubs.

Pivoted upon the lower edge of the front side of the rake-head is the loop 3, which has the two projections Q formed upon its upper corners, and this loop catches into the notch which is formed in the rear side of the arm M, that is connected to the rod or bar L for the purpose of holding the locking-plates, through the rod or bar, in contact with the hubs of the driving-wheels. After this loop has caught— and it always swings automatically forward when the rake is in normal position, so as to catch in the notch in the arm as soon as the arm is drawn forward far enough—it remains in this position until the rake-head is tilted upward sufficiently far for the projections to strike against the top part of the shafts or thill-frame, when the loop is forced backward out of the notch by the projections Q striking against the frame, and the spring then instantly draws the rod L backward, and thereby draws the locking-plates out of contact with the hubs, so that when the rake-head drops back into position, as it will do from its own weight, the wheels are unlocked and the machine moves forward as freely as before.

By the above-described construction it will be seen that it is only necessary for the driver to press down with his foot upon the chain far enough to allow the loop to catch in the notch in the arm, when the locking-plates will be caused to drop in the toothed hubs of the wheels and lock them to the rake-head, and then the rake-head will be caused to dump its load, and as soon as the load is dumped the rod L is automatically released and the rake-head returns to position without causing the driver any further effort. The one movement of the foot causes the load to be dumped without any further exertion or care upon his part.

The locking-plates are here shown and described as being operated by the rod L, having the eccentric projections upon its ends; but these same plates may be operated by cords or chains, instead of the rod or bar, in which case it will only be necessary for the driver to pull upon the chain to cause the plates to lock the wheels, and then, by releasing the chains, suitable springs will cause the plates to fall back out of contact with the wheels, and the rake-head will return to position.

In order to enable the driver to turn the rake-head up when it is desired to keep the teeth out of contact with the ground a pivoted operating-lever is provided, and which operates for this purpose in the usual manner. One great trouble with these operating-levers heretofore has always been that unless the driver moved his arm out of the way as it returned to position after the rake-head was released it would strike it. In order to obviate this trouble, I so construct the lever that it will have both a sidewise as well as a pivoted movement. The sidewise movement may be accomplished in either one of two ways. That part of the lever to which the hand is applied may be attached to the cranked part X at any suitable point above the pivot, and be provided on its inner side with a metallic stop, Y, which is turned at right angles at its upper end and provided with a slot, through which the upper end of the crank passes. Between the upper portion of the crank and the guide is placed a suitable spring, Z, which serves to keep the lever constantly pressed away from the operator. This horizontal part of the guide also serves as a part upon which the driver's foot may be placed and to keep the teeth of the rake on the ground when collecting the load. The lever being inclined always away from the operator when it swings forward, it will not touch him, as would otherwise be the case.

Instead of constructing the lever as here described, the lever itself may be pivoted directly to the upper end of the crank X, so that the upper end of the lever will swing directly away from the operator. A suitable slotted guide, 1, which is secured to the outer side of the lever, and which passes over the upper end of the crank, prevents the lever from dropping down past a horizontal position. Should the driver at any time desire the lever to stand upright, he has only to place his foot upon the short end of the lever, and thus tilt the upper end upward to his hand.

Having thus described my invention, I claim—

1. In a horse hay-rake, the combination of the rake-head A, the castings C, secured to its ends and extending backward, the locking-plates I, pivoted at their rear ends upon these castings and extending forward, the driving-wheels having notches in the inner ends of their hubs, and an operating mechanism, the lower ends of the locking-plates being provided with flanges for catching in the notches in the hubs, substantially as shown.

2. The combination of the rake-head, the castings C, secured thereto, the locking-plates I, pivoted at their rear ends upon these castings, and having flanges upon their lower ends to engage with the hubs of the driving-wheels, the bar or rod L, journaled upon the rake-head and pivoted eccentrically to the locking-plates, and the driving-wheels having notches made in the inner ends of their hubs, substantially as described.

3. The combination of the rake-head A, the driving-wheels having notches J in the inner ends of their hubs, the pivoted locking-plates I, provided with flanges I', and the rod or bar L, eccentrically pivoted to the locking-plates, by means of which the said locking-plates are operated, substantially as set forth.

4. The combination of the pivoted locking-plates I, the rake-head A, and the driving-wheels provided with hubs having notches J in their inner ends, the rod or bar L, eccentrically pivoted to the locking-plates, an arm, M, which is attached to the rod or bar L, and a spring for drawing the rod or bar back into position, and thereby releasing the wheels from the locking-plates, substantially as specified.

5. The combination of the locking-plates I, the driving-wheels provided with notches in the inner ends of their hubs, the rod or bar L, eccentrically pivoted to the locking-plates, an arm, M, which is secured to the rod or bar L, and which has a spring attached to its rear end and which is adapted to engage with the loop 3 at its front end, substantially as shown.

6. The combination of the rake-head A, which is hinged to the tongue-frame, the loop 3, which is pivoted to the rake-head, and an arm, M, which is secured to the rod L, which is eccentrically pivoted to and operates the locking-plates I, the upper end of the loop being made to strike against the tongue-frame when the rake-head tilts forward, substantially as described.

7. The combination of the rod or bar L, provided with an arm which extends beyond it on both sides, and which arm has a spring secured to its rear end and a chain to its front end, and is provided with a notch, with a pivoted loop that is carried by the rake-head in its tilting movement, the eccentric points or projections on the rod or bar, the locking-plates, and the driving-wheels provided with notches on the inner ends of their hubs, the parts being arranged to operate substantially as specified.

8. In a horse hay-rake, the combination of the cranked or bent lever X for dumping the rake, and a handle which is pivoted to the lever so that it can be turned back out of the way, substantially as shown.

9. In a horse hay-rake, the combination of the cranked or bent lever X for dumping the rake, and a handle which is pivoted to the lever so that it can be turned back out of the way, and provided with a suitable guide for controlling its movement, substantially as described.

In testimony whereof I affix my signature in presence of two witnesses.

CHARLES SCHOLZ.

Witnesses:
JOHN ZANITCH,
W. H. CLURK.